US010892960B1

(12) United States Patent
Emelyanov et al.

(10) Patent No.: US 10,892,960 B1
(45) Date of Patent: Jan. 12, 2021

(54) SYSTEM AND METHOD OF UNIFYING AND DEPLOYING A MICROSERVICE-BASED APPLICATION PLATFORM

(71) Applicant: Virtuozzo International GmbH, Schaffhausen (CH)

(72) Inventors: Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

(21) Appl. No.: 16/229,434

(22) Filed: Dec. 21, 2018

(51) Int. Cl.
*G06F 15/173* (2006.01)
*H04L 12/24* (2006.01)
*G06F 9/50* (2006.01)
*H04L 29/08* (2006.01)

(52) U.S. Cl.
CPC ........ *H04L 41/5054* (2013.01); *G06F 9/5072* (2013.01); *H04L 41/0206* (2013.01); *H04L 41/046* (2013.01); *H04L 41/0803* (2013.01); *H04L 41/0893* (2013.01); *H04L 67/34* (2013.01); *H04L 67/10* (2013.01); *H04L 67/16* (2013.01)

(58) Field of Classification Search
CPC ............. H04L 41/5054; H04L 41/0206; H04L 41/046; H04L 41/0803; H04L 41/0893; H04L 67/34; H04L 67/10; H04L 67/16; G06F 9/5072

USPC ......................................................... 709/226
See application file for complete search history.

(56) References Cited

U.S. PATENT DOCUMENTS

2019/0205106 A1* 7/2019 Sharma .................. G06F 8/427

* cited by examiner

*Primary Examiner* — Wing F Chan
*Assistant Examiner* — Joseph R Maniwang
(74) *Attorney, Agent, or Firm* — Arent Fox LLP; Michael Fainberg

(57) ABSTRACT

A system and method is provided for unifying and deploying a microservice-based application platform that includes multiple independent service containers. An exemplary method includes analyzing, on a hardware node, infrastructure services to identify those infrastructure services that are configurable to be launched as microservices; configuring the identified infrastructure services to be launched as microservices by creating an image of an infrastructure microservice container for each identified infrastructure services; building an application platform by defining a minimum set of the infrastructure microservice containers required by the application platform to provide the one or more client microservice; and unifying management of the infrastructure microservice containers and the client microservices of the application platform by classifying each of the created infrastructure microservice containers and the client microservice container to be managed by a single management software layer.

21 Claims, 7 Drawing Sheets

US 10,892,960 B1

SYSTEM AND METHOD OF UNIFYING AND DEPLOYING A MICROSERVICE-BASED APPLICATION PLATFORM

TECHNICAL FIELD

The present disclosure relates generally to managing software applications in cloud computing environments, and, more particularly, to a system and method of unifying and deploying a microservice-based application platform in a cloud computing environment.

BACKGROUND

Cloud computing can generally be characterized as the virtualization and central management of data center resources as software-defined pools. Cloud computing has become increasingly popular as it provides the ability to apply abstracted compute, storage, and network resources to workloads as needed and access an abundance of pre-built services. In a typical cloud computing environment, these pre-built services can be typically provided on a number of hardware nodes that are clustered together forming the cloud.

FIG. 1 illustrates a block diagram of a conventional cluster of hardware node forming a cloud computing network. As generally shown, the cloud computing environment can include a plurality of nodes that each have their specialization, including compute nodes 10A and 10B, storage node 20 and backup node 30. For example, the compute nodes (e.g., compute node 10B) can be provided for running client microservices, storage nodes (e.g., storage node 20) can be provided for running storage software, and backup nodes (e.g., backup node 30) can be provided for running backup software. As further shown, a management software layer for the application platform offered by the cloud will typically be provided on a hardware node (e.g., compute node 10A) and will include a virtual environment ("VE") manager component that starts the virtual environments for the platform. These virtual environments can be started in response to a request from a client device and can include microservices, containers, or stateless containers, for example.

For cloud computing environments to be usable and competitive, the management software layer is typically comprised of different service software, such as a backup server, software-defined storage, software-defined network functionality, and the like, for example. In addition, for each application running on the application platform, the management software layer will also perform a growing number of special tasks for client services, such as monitoring, logging, and updating for example. In this environment, a cloud owner must simultaneously handle the same number of tasks for the different components (e.g., the backup, SDS and SDN services) that run on the management software layer. However, the different services for the application platform are usually managed by separate systems that will perform these same tasks for the different components, but with different interfaces and software. Separating the management of the different services and the execution of the different tasks consumes unnecessary processing resources and overcomplicates the management of such cloud computing environments.

SUMMARY

Accordingly, a system and method is provided herein that unifies the management infrastructure and client services required for an application platform, enabling all tasks executed for the different services to be run for a single software management layer and interface.

Thus, according to one exemplary aspect, a method is provided for unifying management of a platform for microservice-based applications comprising a plurality of infrastructure services and at least one client microservice. In this aspect, the method includes analyzing, on the at least one hardware node, each of the plurality of infrastructure services to identify infrastructure services that are configurable to be launched as microservices; configuring the identified infrastructure services to be launched as microservices by creating an image of an infrastructure microservice container for each of the identified infrastructure services; building an application platform by defining a minimum set of the infrastructure microservice containers required by the application platform to provide the at least one client microservice for at least one client; and unifying management of the infrastructure microservice containers and the at least one client microservice of the application platform by classifying each of the created infrastructure microservice containers and the at least one client microservice container to be managed by a single management software layer.

According to another exemplary aspect, the method further includes analyzing each of a of microservice-based application services to identify each application service that is configurable to be launched as a microservice during building of the application platform, wherein the plurality of microservice-based application services include the plurality of infrastructure services and the at least one client services.

According to another exemplary aspect, the method further includes analyzing of each microservice-based application service comprises determining whether each microservice-based application service is required to run the microservices of the application platform and the applications services that are not required to run the microservices are identified as configurable to be launched as microservices.

According to another exemplary aspect of the method, the microservice-based application services required to run the microservices of the application platform include at least a management service and a storage service for the microservices of the application platform.

According to another exemplary aspect of the method, the minimum set of the infrastructure service containers required by the application platform include an API service container, a software-defined network container and software-defined storage container.

According to another exemplary aspect, the method further includes analyzing performing, by the single management software layer, a same special task for at least one of the infrastructure service containers and the respective client service container of the at least one client service.

According to another exemplary aspect of the method, the same special task comprises at least one of a data backup task, a monitoring task, an updating task, a load balancing task, a security scanning task, a denial of service protection task, a HA-ing task, an access control task, and a configuration management task.

According to another exemplary aspect, a system is provided for unifying management of a platform for microservice-based applications comprising a plurality of infrastructure services and at least one client microservice. In this aspect, the system includes a virtual environment manager configured to analyze, on the at least one hardware node, each of the plurality of infrastructure services to identify infrastructure services that are configurable to be launched as microservices, and configure the identified infrastructure services to be launched as microservices by creating an image of an infrastructure microservice container for each of the identified infrastructure services. Moreover, the system further includes a platform building module configured to build an application platform by defining a minimum set of the infrastructure microservice containers required by the application platform to provide the at least one client microservice for at least one client. According to the exemplary aspect, the virtual environment manager is further configured to unify management of the infrastructure microservice containers and the at least one client microservice of the application platform by classifying each of the created infrastructure microservice containers and the at least one client microservice container to be managed by a single management software layer.

According to anther exemplary aspect of the system, the virtual environment manager is further configured to analyze each of a of microservice-based application services to identify each application service that is configurable to be launched as a microservice during building of the application platform, wherein the plurality of microservice-based application services include the plurality of infrastructure services and the at least one client services.

According to anther exemplary aspect of the system, the virtual environment manager analyzes each microservice-based application service by determining whether each microservice-based application service is required to run the microservices of the application platform and the applications services that are not required to run the microservices are identified as configurable to be launched as microservices.

According to anther exemplary aspect of the system, the microservice-based application services required to run the microservices of the application platform include at least a management service and a storage service for the microservices of the application platform.

According to anther exemplary aspect of the system, the minimum set of the infrastructure service containers required by the application platform include an API service container, a software-defined network container and software-defined storage container.

According to anther exemplary aspect of the system, the single management software layer is configured to perform a same special task for at least one of the infrastructure service containers and the respective client service container of the at least one client service.

According to anther exemplary aspect of the system, the same special task comprises at least one of a data backup task, a monitoring task, an updating task, a load balancing task, a security scanning task, a denial of service protection task, a HA-ing task, an access control task, and a configuration management task.

The above summary of example aspects serves to provide an understanding of the invention. This summary is not an extensive overview of all contemplated aspects, and is intended to neither identify key or critical elements of all aspects nor delineate the scope of any or all aspects of the invention. Its sole purpose is to present one or more aspects in a concise form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
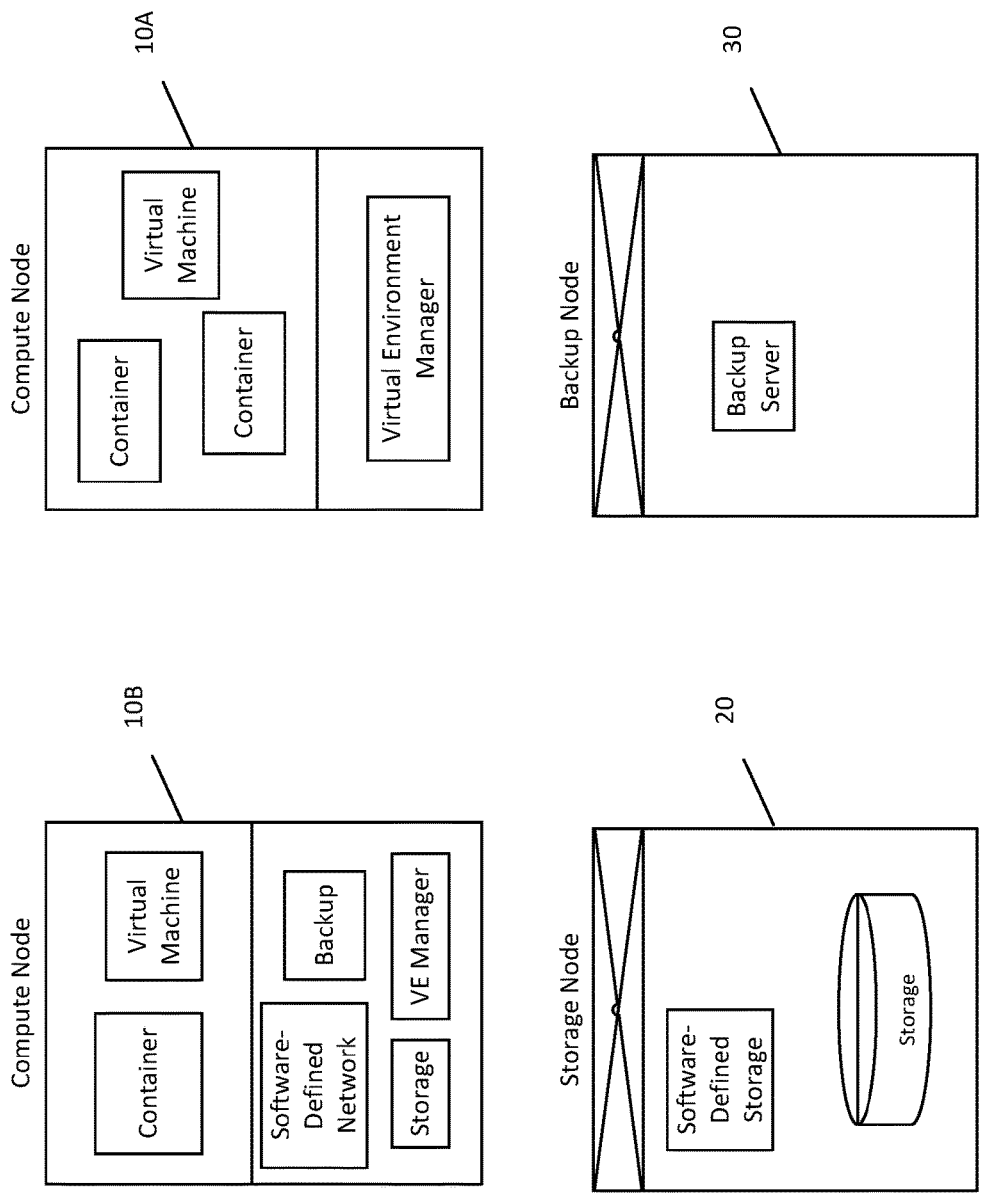
FIG. 1 illustrates a block diagram of a conventional cluster of hardware node forming a cloud computing network.

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

Figure 2:
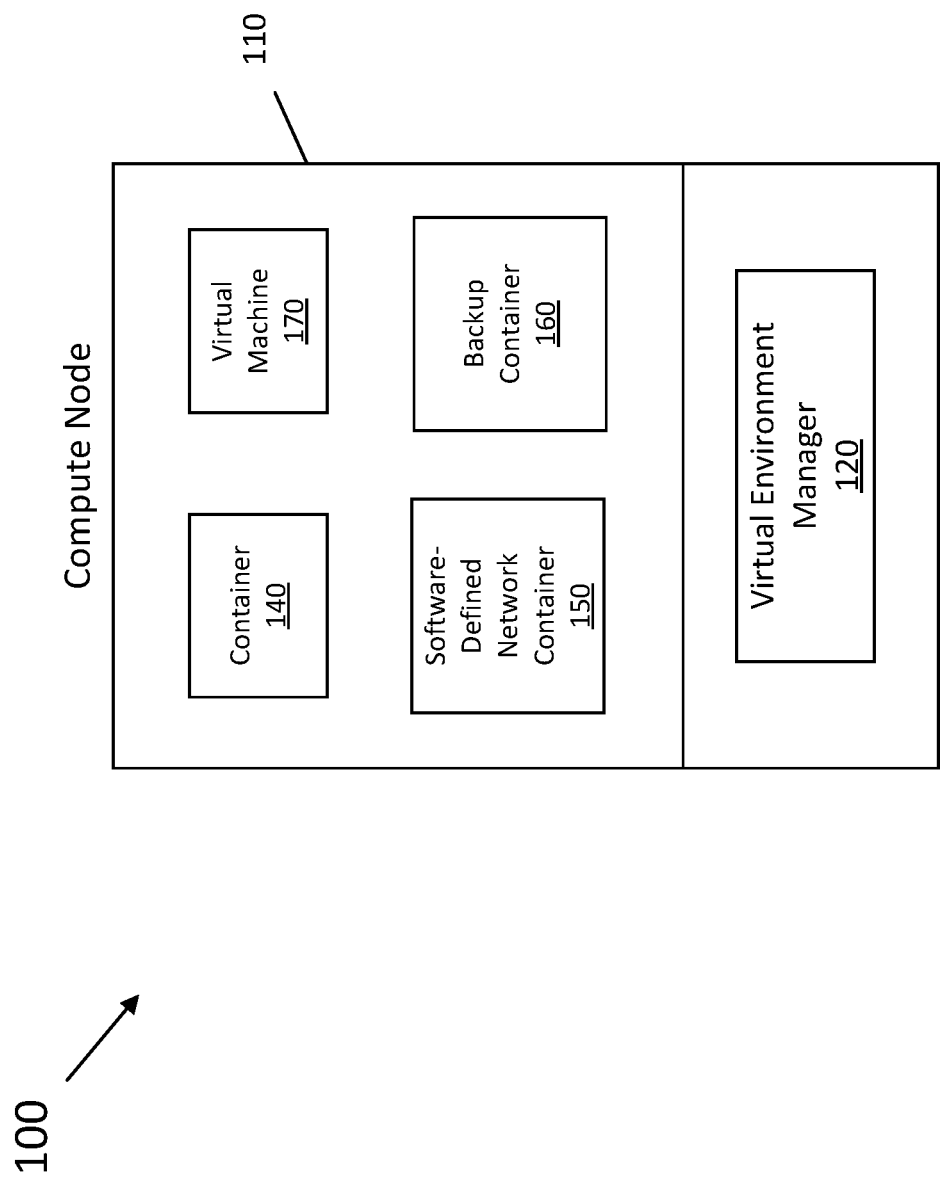
FIG. 2 illustrates a block diagram of a system for unifying and deploying a microservice-based application platform according to an exemplary aspect.

FIG. 2 illustrates a block diagram of a system for unifying and deploying a microservice-based application platform according to an exemplary aspect. In general, application platforms are cloud computing service models that provide end users and organizations (e.g., client computing devices) with hardware, operating systems, storage and/or network capacity required over the cloud to be able to run existing software applications and develop new software applications.

For such existing and new software applications, an application platform can provide a number of services that include, for example, execution services that provides libraries for running software and can support the creation of user interfaces, communication with other software, structuring how code executes, and the like. Moreover, application platforms can provide data services that enable applications to store and process data, such as database management systems. Application platforms can also provide cloud services that enable applications to search the Internet or connect with other applications, for example. Yet further, application platforms can offer development tools that enable development teams to create and maintain applications. Thus, it should be appreciated that these services are exemplary components of the application platform that can be offered to client devices to run and develop software applications in a cloud computing environment.

Currently, for conventional application platforms, these client services are simply Linux services, for example, in which the program code for each service is stored in the root directory and its execution is started by a system process or the hardware node's init system, for example. The exemplary system disclosed herein unifies the management of such services by classifying a maximum number of management software as client microservices and executing special tasks for these clients microservices by the a single software management layer as described above. By classifying the services provided by the application platform as microservices, the disclosed system and method improves the modularity of the application platform, which in turn enables more efficient management and development of the platform.

Thus, as shown in FIG. 2 of the exemplary aspect, a compute hardware node 100 can be provided with a virtual environment ("VE") manager 120 that forms the single management software layer for the application platform. According to the exemplary aspect, management of the platform is performed by two components (though in some aspects one of them can be a part of another, or only one of them can be present). First the VE manager 120 itself is configured to create, launch, migrate, and the like, containers (i.e., its manages running of containers and the managing of the running of the platform after it is deployed). Moreover, a platform building module 130 can create images, analyze microservices, classify components, and the like (i.e., manage container images, create a platform, during preparation of the platform).

Thus, according to the exemplary aspect, the VE manager 120 is configured to manage (e.g., create, launch, migrate) containers, virtual machines, microservices, etc. (both running instances and their corresponding files, disks, resources). In general the compute node 110 can be a hardware node in a cluster of a cloud computing environment, for example, as would be appreciated to one skilled in the art. Moreover, in an exemplary aspect, the VE manager 120 can be comprised as a set of software tools and daemons that are configured to create and launch containers (i.e., isolated user-space instances), virtual machines and the like. Thus, in one exemplary aspect, the VE manager 120 can be a libvirt daemon if the system is providing a VM platform. In another aspect, the VE manager 120 can be a Nova daemon if the system is providing an OpenStack platform. In yet another aspect, the VE manager 120 can be a Docker daemon if the system is providing a Docker-based microservices platform. It should be appreciated that these are simply example implementations of the VE manager 120 according to various aspects.

As further shown, a plurality of components can run on the compute node, such as virtual machine 170 and container 140 (which can be considered a light virtual machine), for example. In addition, the platform deployed by the compute node 110 can include a number of components, including software-defined network ("SDN") container 150 and backup container 160, for example. As will be described in detail below, the VE manager 120 is configured to analyze or evaluate each service of the application platform and determine whether the service can be configured as a container. In the example shown in FIG. 2, containers 150 and 160 (and their images) have been created from an SDN microservice and backup microservice, respectively. The SDN container 150 is a microservice that provides SDN functionality, which is typically a daemon that controls connectivity of physical and virtual switches in the cluster of the cloud. Moreover, the backup container 160 is a microservice with a backup daemon that, in turn, is configured to generate backup copies of data used by the containers, virtual machines and/or microservices of the platform. It should be appreciated that the SDN container 150 and backup container 160 are two microservices required to build the platform (based on their provided functionality) according to an exemplary aspect and that additional containers (not shown) can be created from microservices for the platform.

Figure 3:
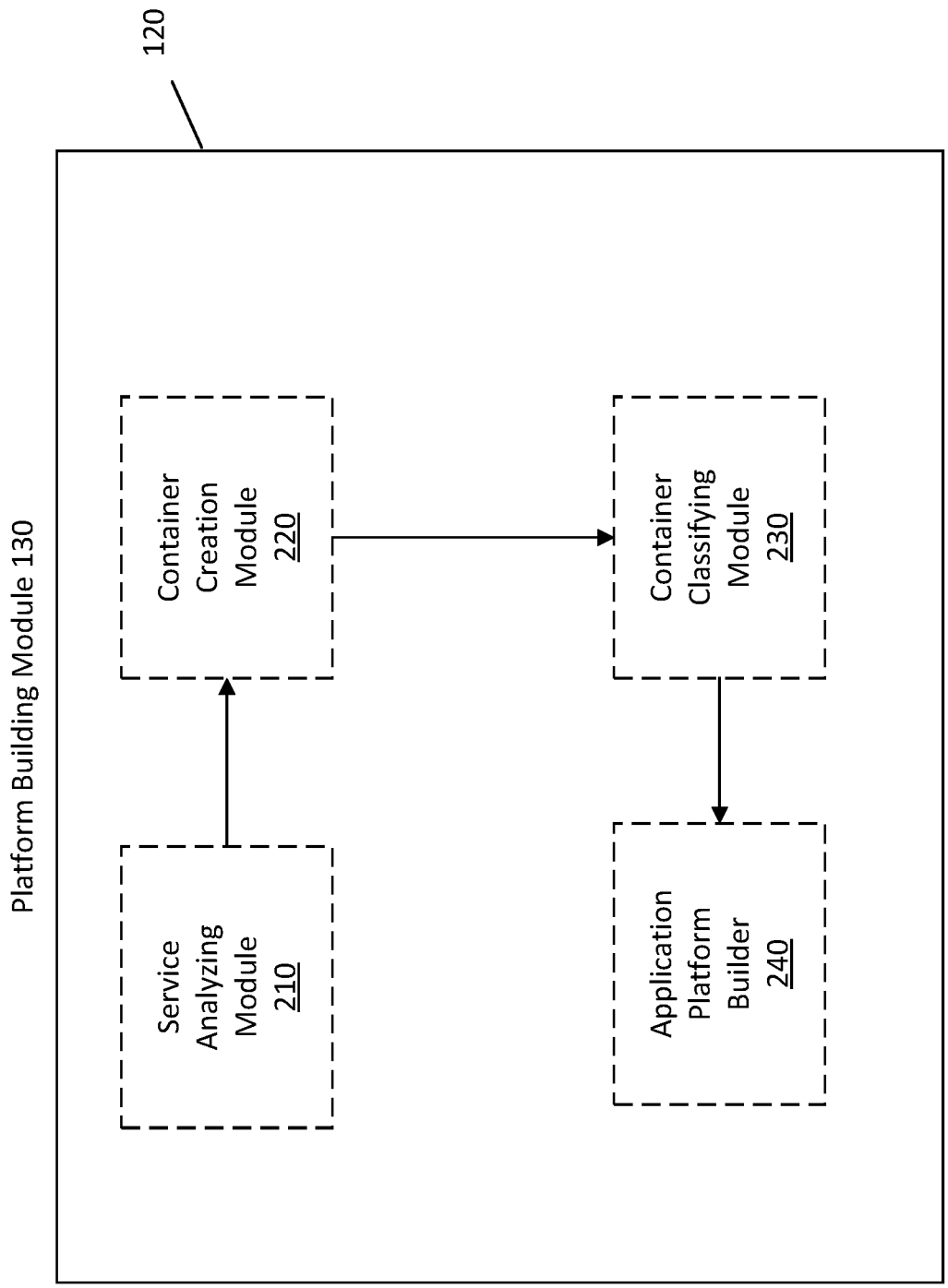
FIG. 3 illustrates a block diagram of the VE manager according to an exemplary aspect.

FIG. 3 illustrates a block diagram of the platform building module according to an exemplary aspect. In an exemplary aspect, the platform building module 130 is comprised of a plurality of modules (or of one module, e.g., a daemon) that are configured to perform the algorithms disclosed herein for unifying components of the platform and building a microservice-based application platform. For example, as shown, the platform building module 130 includes service analyzing module 210, container creation module 220, container classifying module 230, and application platform kernel 240. In different aspects, the order of work of some of these components can be different, and in some aspects, some of the components can work in parallel, they can be merged or in turn comprise several modules, and the like. In some aspects, the VE manager can also be configured as a part of the platform building module 130. Platform building module 130 can work on one hardware node or can be distributed to several hardware nodes. Moreover, platform building module 130 can work on the same node (nodes) where the platform then will be run, or on another node (nodes), or part of it can work on the node (nodes) where the platform will be deployed and another part can work on other node (nodes).

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

According to the exemplary aspect, the service analyzing module 210 is configured to analyze each of the plurality of application services to identify application services that can be configured to be launched as a microservice during deployment of the application platform. It should be appreciated that the service analyzing module 210 does not need to analyze all services, but only those services (or only infrastructure services) needed for a particular application. Moreover, according to an exemplary aspect, all components of the platform can be defined in its source code files (e.g., in descriptor files, specification files, docker files, and the like). During analysis of these components, the service analyzing module 210 determines whether the component can be a microservice or not, for example, the analysis can be performed using (e.g., looking for) special explicit instructions from the developers in such files.

In any event, according to an exemplary aspect, the service analyzing module 210 is configured to identify each service for the application platform. For each such service, the service analyzing module 210 determines whether the service is needed to launch the microservices for the application platform (such services will be called infrastructure services), i.e., it determines which services are needed for minimal workflow for platform deployment. For example, to start a microservice, at a minimum the platform will need a management service and a storage service, in some aspects. In contrast, other services such as the SDN service and backup service (described above with respect to FIG. 2) may not be required for the minimal management of the platform, and, therefore, can be considered as auxiliary services.

Based on the analysis of each service, the service analyzing module 210 is configured to determine the maximum number of that can be configured as microservice containers, which can include also auxiliary services that are not required to launch the microservices. Next the container creation module 220 is configured to create a respective container image for each service that can be launched as a microservice during deployment of the application platform, as determined by the service analyzing module 210. In general, a container image is a set of files that form the root file system of a container, and several metadata files that describe the container (e.g. its start options, desired internal network configuration, and the like). According to an exemplary aspect, from one container image one or more containers can be started. Moreover, as will be described in greater detail below, respective containers can then be run (e.g., by single management software layer) from the corresponding container image. In some aspects, a container can be an isolated user-space instance with its own root file system. Also, in some cases, images of container root file system can be stored locally or remotely (e.g., in registry, like docker-registry). Advantageously, each microservice container can be managed by the single management layer, i.e., VE manager 120, rather than by boot scripts of the node, as is the case for conventional systems.

In addition, according to an exemplary aspect, the container classifying module 230 is configured to classify microservice containers (e.g., using corresponding images) that will be launched and managed by the VE manager 120 when the application platform will be deployed on the hardware node. That is, to simplify management of the platform, the container classifying module 230 is configured to classify the microservices by user, priority, and the like, and, e.g., mark each microservice container with a special class and assigned additional rules.

According to an exemplary aspect, special classes and assigned additional rules can include, for example, to "save" (e.g., migrate to other node in case of fault or high pressure) some containers before others by components providing high availability or dynamic resource scheduling. In addition, such rules can including assigning memory with priority, regulating memory limits (or other resource limits), for example, ignoring limits for some containers, backing up more frequently, and backing up to separate storage. Yet further, such rules can including providing some containers rights to perform some administrative actions with other microservices or other components of the platform (i.e., some microservices can manage (or participate in management of) other microservices). It should be appreciate that the foregoing are examples are special classes and rules and that the disclosed exemplary embodiments are in no way limited to these specific classes and rules.

According to an exemplary aspect, the container classifying module 230 is configured to classify the microservices that will be managed by VE manager 120 as either infrastructure containers or client containers. In this aspect, infrastructure containers have more privileges for working with the hardware node (i.e., compute node 110) than client containers. For example, the infrastructure containers have information on the hardware node and access to the node's hardware that is not provided to the client containers. In addition, the infrastructure containers have special policies that are managed by a cloud owner. By classifying each of the created infrastructure service and client service containers to be managed by the single management software layer when the application platform is deployed on the hardware node, the VE manager 120 can unify the management of the microservices of the application platform.

As further shown, the platform building module 130 includes an application platform builder 240 that is configured to build, on one or more hardware nodes (e.g., compute node 110 and possibly additional nodes in the cluster), the application platform by defining the minimum number of infrastructure micro-service containers required by the application platform to provide one or more client services for a client device utilizing the platform to run and/or develop a software application (and in some aspects, additionally to copy needed container images to the hardware node, on which the application platform will then be deployed). For example, as will be described below, the minimal configuration for the application can include a client API for running the containers, the SDN microservice for network connectivity and a software-defined storage microservice for storing the container files. After the platform is build, according to one exemplary aspect, the VE manager 120 is configured to launch these minimum infrastructure containers from images to deploy the platform. Moreover platform building module 130 (or any of its components) can further: build required software from sources to binaries; build packages (i.e., create packages from binaries). Any kind packages can be used depending on the implementation, e.g., rpm packages can be build, several binaries or packages can be merged into a bigger package (like iso image or yum repo), etc.

After the application platform is deployed, a client device that is using the application platforms for one or more applications can run the client containers required for the particular application. In one aspect, the application platform can run "special tasks" that provide various actions that the application platform can perform on the microservices. These special tasks can include, for example, data backup, monitoring, updates, load balancing, security scanning, DoS (denial of service) protections, "HA-ing", access control, configuration management and the like. Because the infrastructure and client microservices are managed by a single software management layer, the same tasks that may be run for multiple microservices can be run by this same software management layer (i.e., the VE manager 120) rather than by separate systems.

Figure 4:
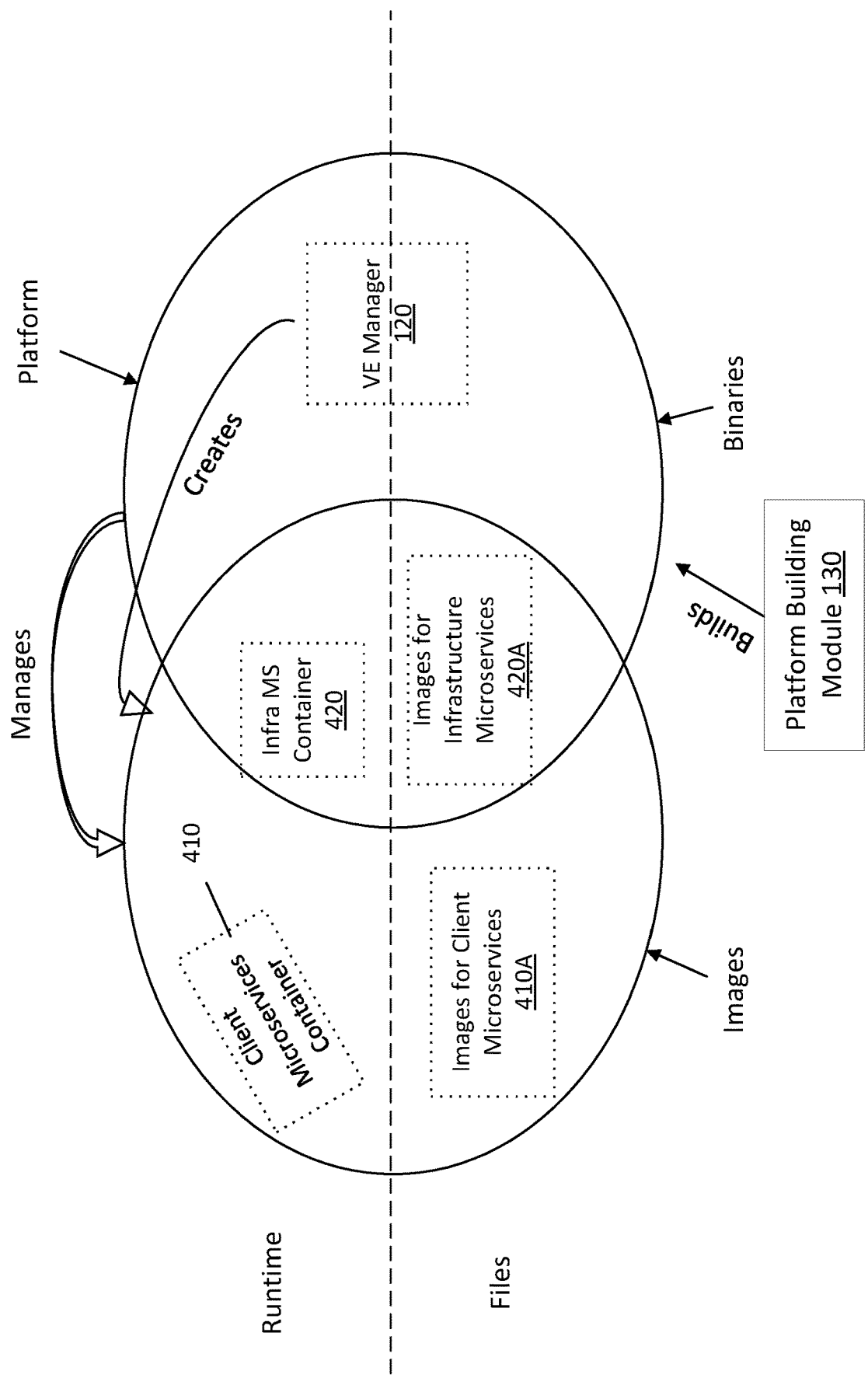
FIG. 4 illustrates a diagram illustrating the components of the application platform according to an exemplary aspect.

As noted above and according to the exemplary aspect, the platform building module 130 first creates container images (i.e., during preparation of the platform) and only then single management layer starts running the container (i.e., during deploy of the platform). FIG. 4 illustrates a diagram illustrating the components of the application platform according to an exemplary aspect. As shown, each component (i.e., each microservice, service, application and the like) has two parts: a file (or an image) on disk and, if the component is started, a process (or processes) that belong to the component and its memory. For example, for microservice, the two parts are an image of a container on disk and a running container where processes of this microservice run. Moreover, for an application, the two parts are a binary on disk and a running application itself.

As explained above, the platform building module and/or single management layer is configured to create respective containers for each service that can be launched as a microservice during deployment of the application platform. To do so, an image of the container is first created on disk before running a container, where processes of this microservice run. In the example shown in FIG. 4, the platform building module (e.g., the container creation module 220) first creates images for infrastructure microservices (e.g., image 420A) and also images for client microservices (e.g., image 410A). The corresponding containers (e.g., containers 410 and 420) can then be launched during runtime. According to another exemplary aspect for an application, a binary is provided on the disk for running the application itself.

According to one aspect, when a platform is being prepared as described above, images are prepared using the container creation module 220 of the platform building module, for example. Then when the platform is launched, the single management layer (e.g., VE manager 120) creates containers (and starts microservices in them) as well as applications and the like. In this exemplary aspect, the platform contains the VE manager 120, which is launched first and then creates the infrastructure containers and then creates the client containers, as described above. It is further noted that the platform manages microservice containers (e.g., client containers and infrastructure containers) and itself contains (i.e., consists of) microservice containers (e.g., infrastructure containers). As further described herein, both the client microservices and infrastructure microservice are managed uniformly by a single management software layer.

Figure 5:
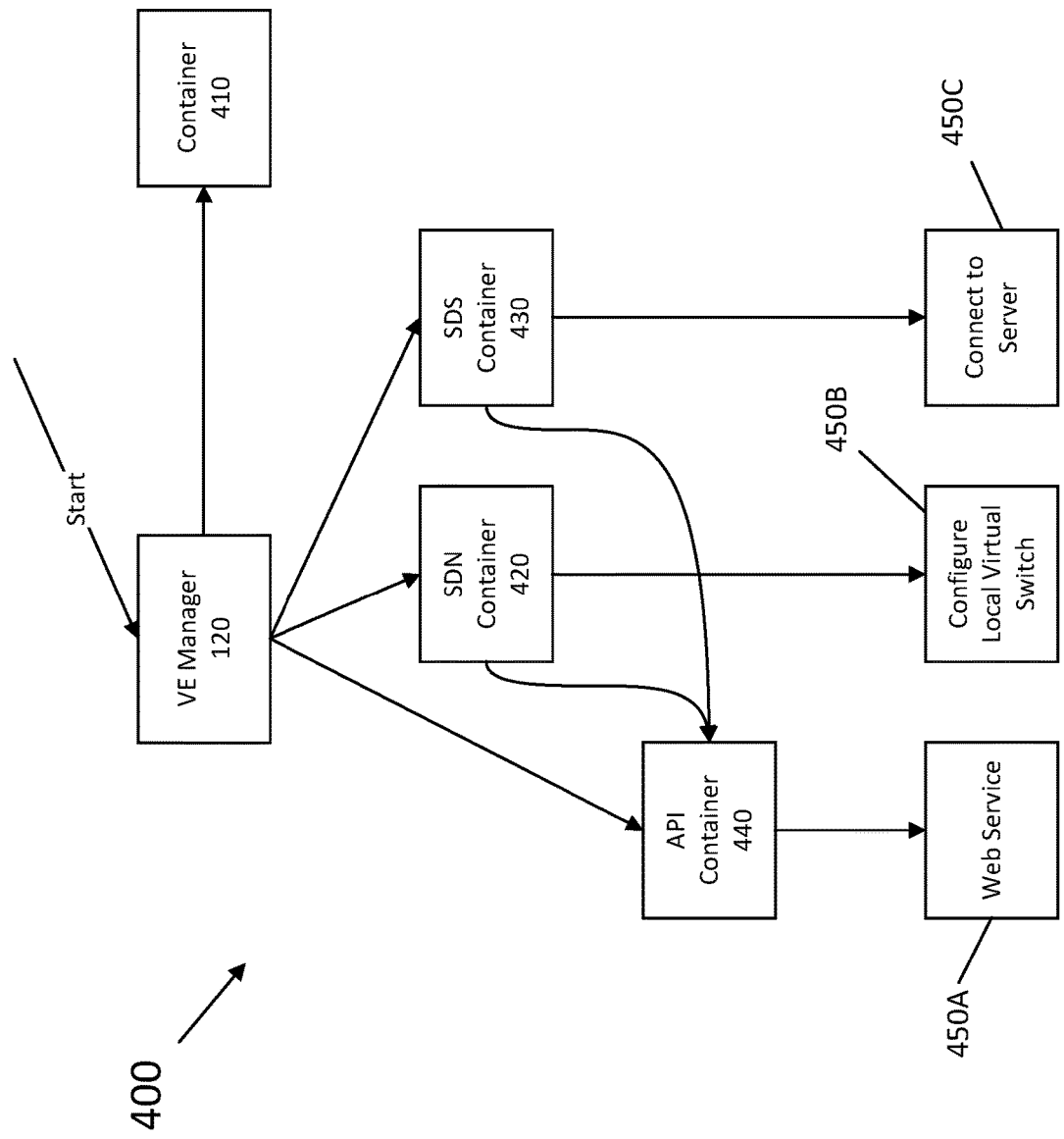
FIG. 5 illustrates a flow diagram of a process for unifying and deploying a microservice-based application platform according to an exemplary aspect.

FIG. 5 illustrates a flow diagram of a process for deploying a microservice-based application platform according to an exemplary aspect. As shown, initially, the VE manger 120 (e.g., the application platform kernel 240) is configured to run only the infrastructure containers required to build a microservice-based application platform for one or more client devices. As shown in the exemplary aspect, these infrastructure containers include SDN container 420, SDS ("software-defined storage") container 430, and API container 440, the functionality of each of which is described above. It is noted that SDN container 420 is an example infrastructure container run from container image 420A as described above with respect to FIG. 4. According to an exemplary aspect, these three containers comprise the minimal configuration required to deploy a microservice-based application platform.

After the application platform is deployed with these three infrastructure containers, additional client microservice containers can be run as needed for execution of a particular software application run by the one or more client devices. For example, as shown, microservices for web services 450A, configure local virtual switch 450B and connection to service 450C can be run for the software application. As further shown, the VE manager 120 is configured to create additional microservice containers (e.g., container 410) utilizing the algorithms described above. It is noted that container 410 is an example client container run from container image 410A as described above with respect to FIG. 4. Finally, during execution of the application, the VE manager 120 (as the management software layer) is configured to perform the special tasks for the client microservices, which effectively simplifies the operation of the application and minimizes required computing resources since the single management software layer (i.e., the VE manager 120) is managing all infrastructure and client containers as well as the performing the same special tasks for these containers.

Figure 6:
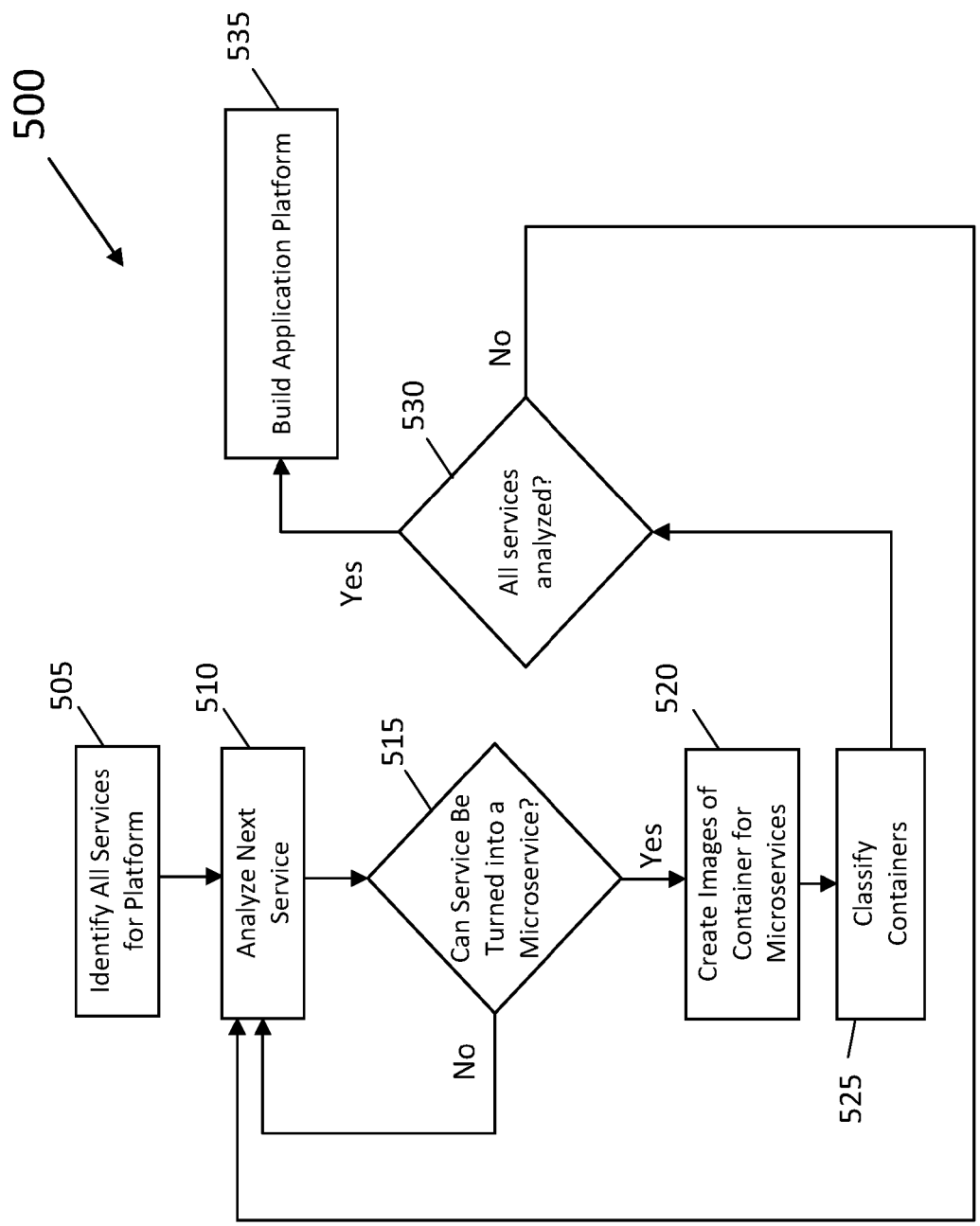
FIG. 6 illustrates a flowchart of a method for unifying and deploying a microservice-based application platform according to an exemplary aspect.

FIG. 6 illustrates a flowchart of a method for unifying and building a microservice-based application platform according to an exemplary aspect. It is noted that according to an exemplary aspect, each of the steps of the method 500 can be performed by the platform building module 130 (which can use VE manager 120) and/or one or more of the modules as described above. As shown, each of the services for the application platform are initially identified at step 505. At step 510, the platform building module analyzes each service to determine whether such service can be turned into a microservice at step 515. As described above, services that can be determined as auxiliary services (i.e., they are not required to launch and run the microservices themselves) can also be turned into microservice. As further shown, for each service that can be turned into a microservice, the method proceeds to step 520 where the platform building module creates images of containers for each such microservice. These microservice containers can then be classified at step 525, as infrastructure containers and client containers, for example. As further shown, after each container is classified at step 525, the method checks whether all services have been analyzed at step 520 and repeats the process (back to step 510) until all services are analyzed (i.e., a Yes at step 530). At this point, the microservice-based application platform can be built, in step 535. For example, on this step, the set of images of infrastructure containers needed for the application platform is determined. Thus, as described above, the disclosed method 500 builds a platform and enables a single management software layer (e.g., the VE manager 120) to manage the infrastructure and client containers and perform the same tasks for these different microservice containers. Advantageously, the disclosed system and method provides modularity, unification of management, administrating, monitoring, backing up, updating, and performing high availability of client and infrastructure components. Yet further, security and fault tolerance can be improved because components are now isolated microservices. This also facilitates maintenance and development, reducing the costs of these operations In operation, the system of the hardware node (e.g., compute node 110) initially boots and the operating system is launched. Then the core platform services are started. As described above, in one aspect, the core platform services can include the SDN container 420, the SDS container 430, and the API container 440. Once these infrastructure containers are launched, the application specific client containers can be launched and the special tasks for these client containers can be run by the VE manager 120 to run the client application for the one or more client devices.

Figure 7:
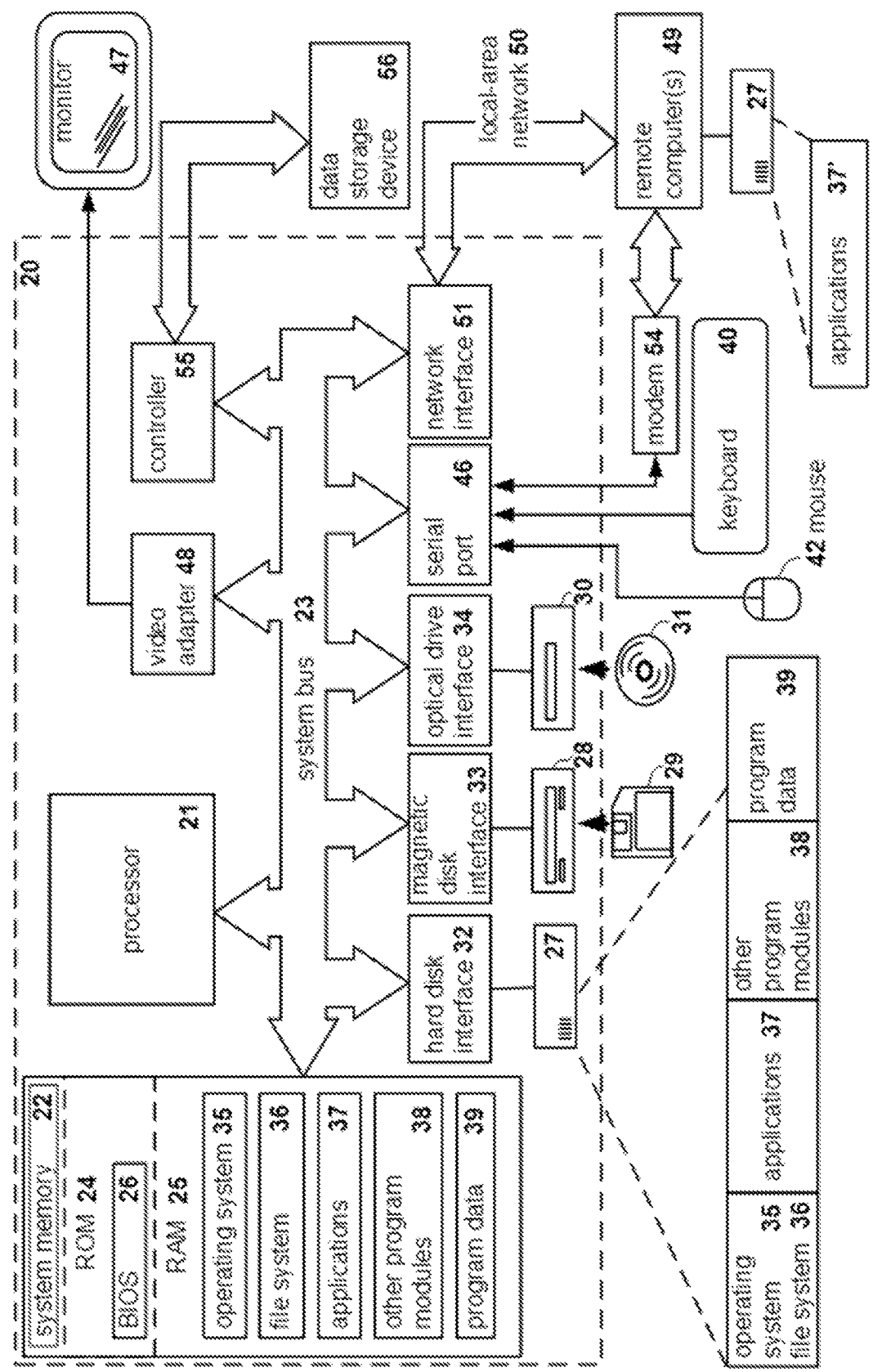
FIG. 7 illustrates a block diagram illustrating a general-purpose computer system on which aspects of systems and methods may be implemented in accordance with an exemplary aspect.

FIG. 7 illustrates a block diagram illustrating a general-purpose computer system on which aspects of systems and methods may be implemented in accordance with an exemplary aspect. It is noted that the computer system 20 can be used to implement the compute node 110 as described above, according to an exemplary aspect.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

As described above, computer system 20 may operate in a network environment, using a network connection to one or more remote computers 49. The remote computer (or computers) 49 may be local computer workstations or servers (e.g., other nodes in the cluster) comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method of unifying management of a platform for microservice-based applications comprising a plurality of infrastructure services and at least one client microservice, the method comprising:

analyzing, on at least one hardware node, each of the plurality of infrastructure services to identify infrastructure services that are configurable to be launched as microservices;

configuring the identified infrastructure services to be launched as microservices by creating an image of an infrastructure microservice container for each of the identified infrastructure services;

building an application platform by defining a minimum set of the infrastructure microservice containers required by the application platform to provide the at least one client microservice for at least one client; and unifying management of the infrastructure microservice containers and the at least one client microservice of the application platform by classifying each of the infrastructure microservice containers and at least one client microservice container to be managed by a single management software layer.

2. The method according to claim 1, further comprising analyzing each of a plurality of microservice-based application services to identify each application service that is configurable to be launched as a microservice during building of the application platform, wherein the plurality of microservice-based application services include the plurality of infrastructure services and the at least one client services.

3. The method according to claim 2, wherein the analyzing of each microservice-based application service comprises determining whether each microservice-based application service is required to run the microservices of the application platform and the applications services that are not required to run the microservices are identified as configurable to be launched as microservices.

4. The method according to claim 3, wherein the microservice-based application services required to run the microservices of the application platform include at least a management service and a storage service for the microservices of the application platform.

5. The method according to claim 1, wherein the minimum set of the infrastructure service containers required by the application platform include an API service container, a software-defined network container and software-defined storage container.

6. The method according to claim 1, further comprising performing, by the single management software layer, a same special task for at least one of the infrastructure service containers and a respective client service container of the at least one client services.

7. The method according to claim 6, wherein the same special task comprises at least one of a data backup task, a monitoring task, an updating task, a load balancing task, a security scanning task, a denial of service protection task, a HA-ing task, an access control task, and a configuration management task.

8. A system of unifying management of a platform for microservice-based applications comprising a plurality of infrastructure services and at least one client microservice, the system comprising:
 a virtual environment manager running on at least one hardware node configured to:
  analyze each of the plurality of infrastructure services to identify infrastructure services that are configurable to be launched as microservices, and
  configure the identified infrastructure services to be launched as microservices by creating an image of an infrastructure microservice container for each of the identified infrastructure services; and
 a platform building module running on the at least one hardware node configured to-build an application platform by defining a minimum set of the infrastructure microservice containers required by the application platform to provide the at least one client microservice for at least one client, and
 wherein the virtual environment manager is further configured to unify management of the infrastructure microservice containers and the at least one client microservice of the application platform by classifying each of the infrastructure microservice containers and at least one client microservice container to be managed by a single management software layer.

9. The system according to claim 8, wherein the virtual environment manager is further configured to analyze each of a plurality of microservice-based application services to identify each application service that is configurable to be launched as a microservice during building of the application platform, wherein the plurality of microservice-based application services include the plurality of infrastructure services and the at least one client services.

10. The system according to claim 9, wherein the virtual environment manager analyzes each microservice-based application service by determining whether each microservice-based application service is required to run the microservices of the application platform and the applications services that are not required to run the microservices are identified as configurable to be launched as microservices.

11. The system according to claim 10, wherein the microservice-based application services required to run the microservices of the application platform include at least a management service and a storage service for the microservices of the application platform.

12. The system according to claim 8, wherein the minimum set of the infrastructure service containers required by the application platform include an API service container, a software-defined network container and software-defined storage container.

13. The system according to claim 8, wherein the single management software layer is configured to perform a same special task for at least one of the infrastructure service containers and a respective client service container of the at least one client services.

14. The system according to claim 13, wherein the same special task comprises at least one of a data backup task, a monitoring task, an updating task, a load balancing task, a security scanning task, a denial of service protection task, a HA-ing task, an access control task, and a configuration management task.

15. A non-transitory computer-readable medium storing therein instructions for of unifying management of a platform for microservice-based applications comprising a plurality of infrastructure services and at least one client microservice, the instructions comprising:
 analyzing, on at least one hardware node, each of the plurality of infrastructure services to identify infrastructure services that are configurable to be launched as microservices;
 configuring the identified infrastructure services to be launched as microservices by creating an image of an infrastructure microservice container for each of the identified infrastructure services;
 building an application platform by defining a minimum set of the infrastructure microservice containers required by the application platform to provide the at least one client microservice for at least one client; and
 unifying management of the infrastructure microservice containers and the at least one client microservice of the application platform by classifying each of the infrastructure microservice containers and at least one client microservice container to be managed by a single management software layer.

16. The non-transitory computer-readable medium according to claim 15, wherein the instructions further comprise analyzing each of a plurality of microservice-based application services to identify each application service that is configurable to be launched as a microservice during building of the application platform, wherein the plurality of microservice-based application services include the plurality of infrastructure services and the at least one client services.

17. The non-transitory computer-readable medium according to claim 16, wherein the analyzing of each microservice-based application service comprises determining whether each microservice-based application service is required to run the microservices of the application platform and the applications services that are not required to run the microservices are identified as configurable to be launched as microservices.

18. The non-transitory computer-readable medium according to claim 17, wherein the microservice-based application services required to run the microservices of the application platform include at least a management service and a storage service for the microservices of the application platform.

19. The non-transitory computer-readable medium according to claim 15, wherein the minimum set of the infrastructure service containers required by the application platform include an API service container, a software-defined network container and software-defined storage container.

20. The non-transitory computer-readable medium according to claim 15, wherein the instructions further comprise performing, by the single management software layer, a same special task for at least one of the infrastructure service containers and a respective client service container of the at least one client services.

21. The non-transitory computer-readable medium according to claim 20, wherein the same special task comprises at least one of a data backup task, a monitoring task, an updating task, a load balancing task, a security scanning task, a denial of service protection task, a HA-ing task, an access control task, and a configuration management task.

* * * * *